United States Patent
Noma et al.

(10) Patent No.: US 6,748,326 B1
(45) Date of Patent: Jun. 8, 2004

(54) INFORMATION PROCESSING APPARATUS AND METHOD FOR DISPLAYING WEATHER DATA AS A BACKGROUND FOR AN ELECTRONIC PET IN A VIRTUAL SPACE

(75) Inventors: Tsunetake Noma, Tokyo (JP); Naohiro Yokoo, Kanagawa (JP); Hiroshi Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/689,581

(22) Filed: Oct. 12, 2000

(30) Foreign Application Priority Data

Oct. 15, 1999 (JP) .......................................... P11-293208

(51) Int. Cl.⁷ .............................................. G06F 19/00
(52) U.S. Cl. ................................ 702/3; 463/40; 463/43
(58) Field of Search ............................................. 702/3

(56) References Cited

U.S. PATENT DOCUMENTS

| | | | |
|---|---|---|---|
| 5,393,070 A | 2/1995 | Best | 273/434 |
| 5,572,646 A | 11/1996 | Kawai et al. | 395/501 |
| 5,586,257 A | 12/1996 | Perlman | 463/42 |
| 5,659,691 A | 8/1997 | Durward et al. | 395/329 |
| 5,727,950 A | 3/1998 | Cook et al. | 434/350 |
| 5,754,740 A | 5/1998 | Fukuoka et al. | 395/68 |
| 5,761,644 A | 6/1998 | Ueda et al. | 705/1 |
| 5,802,296 A | 9/1998 | Morse et al. | 395/200.38 |
| 5,812,126 A | 9/1998 | Richardson et al. | 345/330 |
| 5,848,134 A | 12/1998 | Sekiguchi et al. | 379/93.15 |
| 5,850,352 A | 12/1998 | Moezzi et al. | 364/514 A |
| 5,880,731 A | 3/1999 | Liles et al. | 345/349 |
| 5,926,179 A | 7/1999 | Matsuda et al. | 345/355 |
| 5,941,770 A | 8/1999 | Miers et al. | 463/13 |
| 5,956,028 A | 9/1999 | Matsui et al. | 345/329 |
| 5,956,038 A | 9/1999 | Rekimoto | 345/419 |
| 5,956,485 A | 9/1999 | Perlman | 395/200.34 |
| 5,966,129 A | 10/1999 | Matsukuma et al. | 345/418 |
| 5,966,526 A | 10/1999 | Yokoi | 395/500.32 |
| 5,971,855 A | 10/1999 | Ng | 463/42 |
| 5,982,372 A | 11/1999 | Brush, II et al. | 345/418 |
| 5,983,003 A | 11/1999 | Lection et al. | 395/200.32 |
| 6,009,460 A | 12/1999 | Ohno et al. | 709/204 |

FOREIGN PATENT DOCUMENTS

| | | | | |
|---|---|---|---|---|
| JP | 7-160853 | 6/1995 | ........... | G06F/15/62 |
| JP | 9-81781 | 3/1997 | ........... | G06F/15/62 |

OTHER PUBLICATIONS

Bielski, Lauren, "Ready, Steady . . . go: imaging and the virtual studio", May 1995, Advanced Imaging, v10, n5, p 40(4).*
M. Pesce, "VRML Browsing & Building Cyberspace," New Riders Publishing 1995, pp. 43–81.
Nikkei Electronics, No. 686, Apr. 7, 1997, pp. 131–134.
Nikkei Electronics, No. 670, Sep. 9, 1996, pp. 151–159.
K. Matsuda, "Latest Trends of VRML and Cyberpassage VRML 2.0 and JAVA," Part 1, BIT, vol. 28, No. 7, Jul. 1996, pp. 29–36, English Translation pp. 1–25.

(List continued on next page.)

Primary Examiner—Marc S. Hoff
Assistant Examiner—Anthony Gutierrez
(74) Attorney, Agent, or Firm—Oblon, Spivak, McClelland, Maier & Neustadt, P.C.

(57) ABSTRACT

An information processing apparatus and method as well as a program storage medium wherein the weather of a real space is reflected on the weather of a virtual space. A plurality of personal computers can communicate data with a weather server over a display section. The weather server provides the look of the sky imaged by a video camera as weather information. Each of the personal computers displays, for example, when it is operating with an application for an electronic pet, a weather of a virtual space in which an electronic pet lives based on the weather information provided from the weather server.

12 Claims, 12 Drawing Sheets

OTHER PUBLICATIONS

K. Matsuda, "Latest Trends of VRML and Cyberpassage VRML 2.0 and JAVA," Part 2, BIT, vol. 28, No. 8, Aug. 1996, pp. 57–65, English Translation pp. 1–27.

Y. Honda, "Latest Trends of VRML and Cyperpassage VRML+Network=Cyberspace?" Part 3, BIT, vol. 28, No. 9, Sep. 1996, pp. 29–36, English Translation pp. 1–.

Y. Honda, "Latest Trends of VRML and Cyberpassage How to Build Multi–User Environment Using Cyberspace," Part 4, BIT, vol. 28, No. 10, pp. 49–58, English Translation pp. 1–27.

C. Morningstar et al. The Lessons of Lucasfilm's Habitat, *Cyberspace: First Steps*, MIT Press, Jul. 1992, pp. 273–301.

S. Chen et al., "The Out of Box Experience: Lessons Learned Creating Compelling VRML 2.0 Content," Proceedings of the Second Symposium on Virtual Reality Modeling Language, Feb. 1997, pp. 83–92.

B. Damer et al., Peopled Online Virtual Worlds: A New Home for Cooperating Communities, A New Frontier for Interaction Design (Panel), Proceedings of the ACM Conference on Computer Supporter Cooperative Work, Nov. 1996, pp. 441–442.

S. Harrison et al., "Re–Placeing Space: The Roles of Place and Space in Collaborative Systems," Proceedings of the ACM Conference on Computer Supporter Cooperative Work, Nov. 1996, pp. 67–76.

R. Lea et al., "Community Place: Architecture and Performance," Proceedings of the Second Symposium on Virtual Reality Modeling Language, Feb. 1996, pp. 41–50.

B. Damer, Inhabited Virtual Worlds: A New Frontier for Interaction Design, Interactions, vol. 3, Issue 5, Sep./Oct. 1996, pp. 27–34.

W. Broll., "Populating the Internet: Supporting Multiple Users and Shared Applications with VRML," Proceedings of the Second Symposium on Virtual Reality Modeling Language, FEB. 1997, pp. 33–40.

D. Kurlander et al., "Comic Chat," Proceedings of the 23rd Annual Conference on Computer Graphics, Aug. 1996, pp. 225–236.

Ultima III Manual and Selected Pages from Ultima I–VIII, Collection Maual.

K. Perlin et al., "Improv: A System for Scripting Interactive Actors in Virtual Worlds," Proceedings of the 23rd Annual Conference on Computer Graphics, Aug. 1996, pp. 205–216.

"Sony Begins OEM Sales of Community Place VRML 2.0 3D Internet Browser and Multi–User Server Software," Jan. 30, 1997 Press Release, Material Collected from the Internet, http://www.world.sony.com/corporateinfo/news–e/199701/9701–30/ index.html, 3 pages.

"VRML 2.0 Laboratory–How to Create," Material Collected from the Internet, Mar. 8, 2000, http://www.ses.co.jp/ses/staff/kan/howto/howto1.html, 5 pages.

Virtual Reality Modeling Language Version 2.0, ISO/IEC CD 14772, Aug. 4, 1996, Section 4, "Concepts".

* cited by examiner

F I G. 10
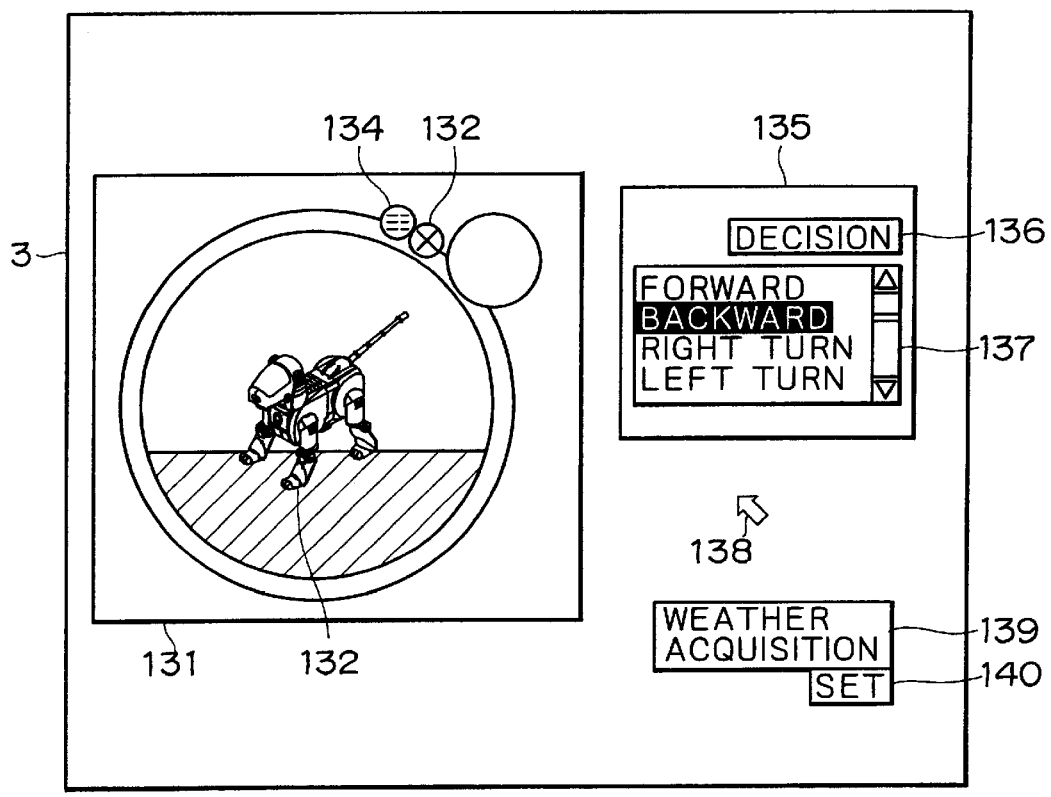

INFORMATION PROCESSING APPARATUS AND METHOD FOR DISPLAYING WEATHER DATA AS A BACKGROUND FOR AN ELECTRONIC PET IN A VIRTUAL SPACE

BACKGROUND OF THE INVENTION

This invention relates to an information processing apparatus and method as well as a program storage medium, and more particularly to an information processing apparatus and method as well as a program storage medium wherein the weather of a real space is reflected on a virtual space.

A pet called electronic pet that is grown in a virtual space produced by a computer or the like is being popularized. Such a pet as just mentioned is applied also to three-dimensional (3D) chatting, and a user of the pet is a branch of the user itself called avatar (an incarnation of a God who appears in the mythology of India) who corresponds to a pet. The avatar moves around a virtual space and, when the avatar meets with the avatar of another user, it can chat with the avatar (user).

The weather in a virtual space for an electronic pet or 3D chatting described above is not specifically set, or else is varied in accordance with a condition set in advance or, for example, after every interval of time such as every day. The virtual space and the real space do not relate to each other in this manner, and conventionally it is impossible to judge the weather of the real space from the weather of the virtual space. Also where the weather is varied after every interval of time, since only limited weathers set in advance are available, there is a subject to be solved that variations are not sufficient.

SUMMARY OF THE INVENTION

It is an object of the present invention to provide an information processing apparatus and method as well as a program storage medium wherein the weather of a real space is reflected on the weather of a virtual space so as to provide the virtual space with reality and with abundant variations.

In order to attain the object described above, according to an aspect of the present invention, there is provided an information processing method, comprising the steps of signaling a signal for requesting for data regarding a desired district to an external apparatus, receiving data regarding the desired district from the external apparatus, and displaying the received signal or information corresponding to the received signal in a predetermined form.

According to another aspect of the present invention, there is provided an information processing apparatus, comprising signaling means for signaling a signal for requesting for data regarding a desired district to an external apparatus, reception means for receiving data regarding the desired district from the external apparatus, and display means for displaying the received signal or information corresponding to the received signal in a predetermined form.

According to a further aspect of the present invention, there is provided a program storage medium on which a computer-readable program to be executed by an information processing apparatus is stored, the program comprising the steps of signaling a signal for requesting for data regarding a desired district to an external apparatus, receiving data regarding the desired district from the external apparatus, and displaying the received signal or information corresponding to the received signal in a predetermined form.

In the information processing method and apparatus and the program of the program storage medium, the data regarding the desired district may data regarding the weather of the desired district. The desired form may be a background formed on a virtual space. The received signal may be image data representative of the weather, and the image data representative of the weather may be an image picked up actually by means of an image pickup apparatus. The received signal includes information corresponding to a time at which the signal requesting for the data is issued.

With the information processing method and apparatus and the program of the program storage medium, a signal for requesting for data regarding a desired district is signaled to an external apparatus, and data regarding the desired district such as data regarding the weather of a desired district are received from the external apparatus. Then, the received signal, which may be image data picked up actually by an image pickup apparatus and representative of the weather or information corresponding to the received signal and include information corresponding to the time at which the signal for requesting data is issued, is displayed in a predetermined form such as a background formed on a virtual space. Consequently, the image of the real space can be reflected on the virtual space.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 10 is a view showing an example of a display image which is displayed on a display section of the personal computer of FIG. 2;

DETAILED DESCRIPTION OF THE PREFERRED EMBODIMENT

Figure 1:
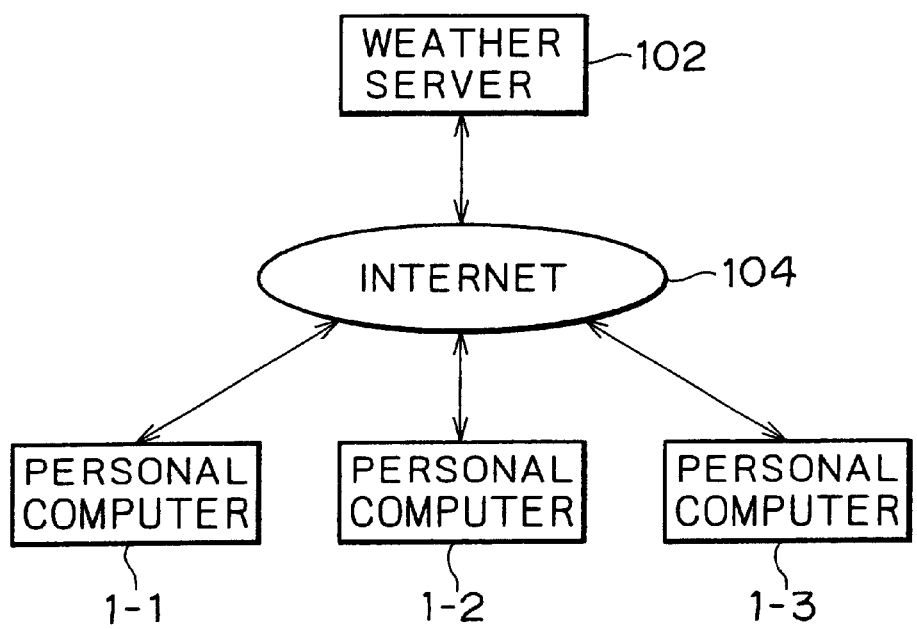
FIG. 1 is a block diagram showing a construction of a weather information processing system to which the present invention is applied.

Referring first to FIG. 1, there is shown a system to which the present invention is applied and wherein an electronic pet in a virtual space is grown and the weather of the virtual space is associated with the real space. The system shown includes three personal computers 1-1 to 1-3 (in the description below, where there is no necessity to distinguish the personal computers 1-1 to 1-3 from one another, they are or each of them is referred to simply as personal computers 1 or client computer 1) and a single weather server 102 connected to computers, for example, over the Internet 104.

Now, an example of a construction of each personal computer 1 is described with reference to FIGS. 2 to 6. The personal computer 1 is in the form of a portable personal computer which has a size equal to or smaller then the B5 size (a paper size prescribed in the Japanese Industrial Standard) and is easy to carry. The personal computer 1 includes a body 2 and a display section 3 mounted for pivotal opening and closing movement with respect to the body 2.

A plurality of operation keys 4 which are operated in order to input various characters, symbols, numerals and so forth, a stick type pointing device 5 which is operated in order to move a cursor displayed on the display section 3, a built-in speaker 6, and a shutter button 7 which is operated in order to pick up an image by means of a CCD (Charge Coupled Device) camera 23 provided on the display section 3 are provided on an upper face of the body 2.

A liquid crystal display (LCD) unit 21 is provided on a front face of the display section 3, and an image pickup section 22 including the CCD camera 23 is mounted at an upper end portion of a central portion of the front face of the display section 3 for pivotal motion with respect to the display section 3.

Figure 3:
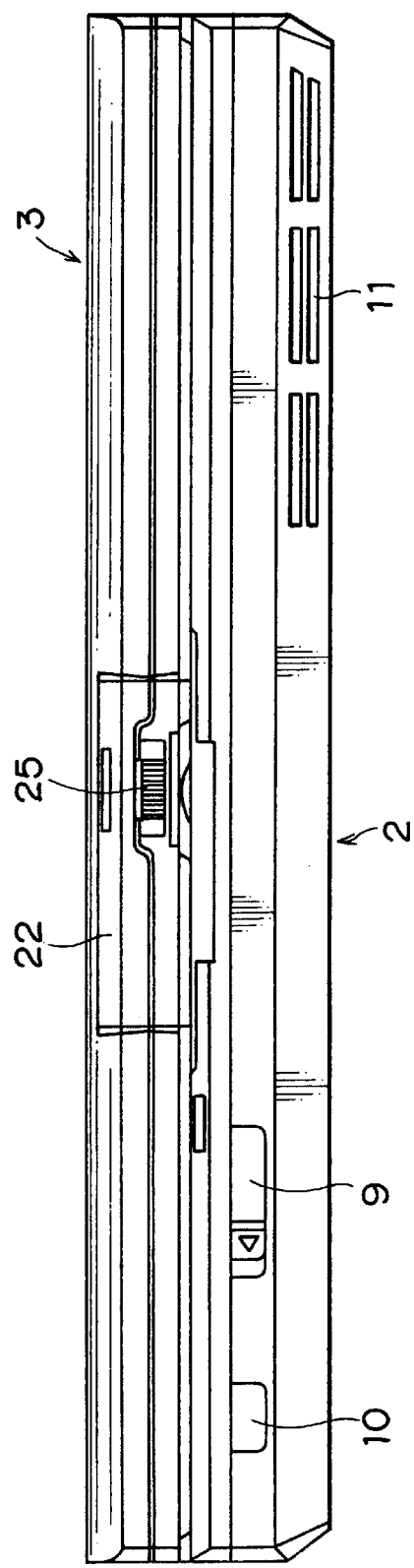
FIG. 3 is a front elevational view showing a construction of the front of the personal computer of FIG. 2.

In particular, the image pickup section 22 can be pivoted to an arbitrary position within a range of 180 degrees between a position at which it is directed in the same direction as the display section 3 and another position in which it is directed in the opposite direction, that is, it is directed to the back of the display section 3. Further, as seen in FIG. 3, an adjustment ring 25 for focusing adjustment of the CCD camera 23 is provided on the image pickup section 22.

Figure 6:
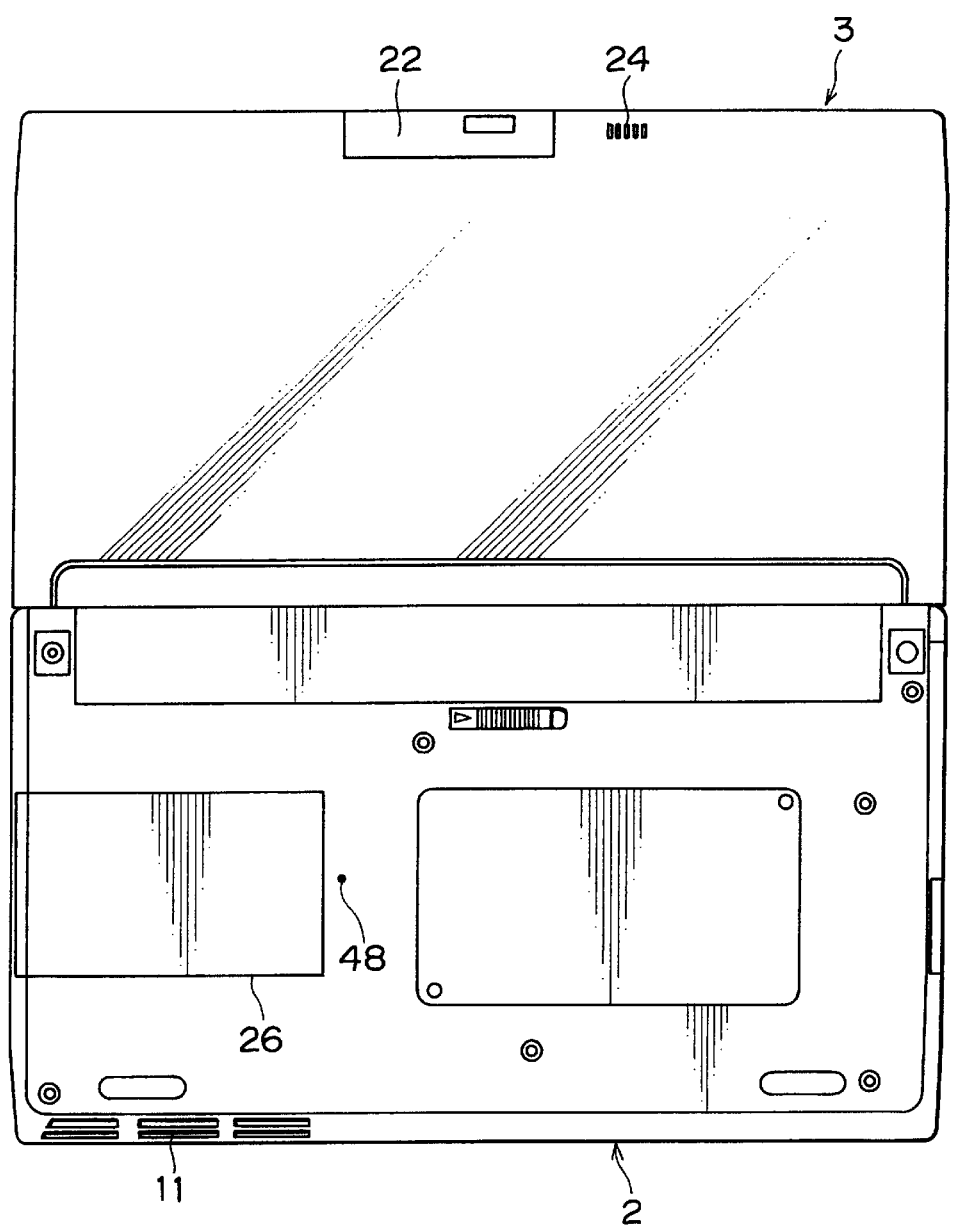
FIG. 6 is a bottom plan view showing a construction of the bottom of the personal computer of FIG. 2.

A microphone 24 is mounted on the left side of the image pickup section 22 on the front face of the display section 3 (FIG. 2) such that it can collect sound also from the rear face side of the display section 3 as seen in FIG. 6.

A power supply lamp PL, a battery lamp BL, a message lamp ML and some other lamps each formed from a light emitting diode (LED) are provided at a lower portion of a central portion of the front face of the display section 3.

A pawl 13 is provided on the left side of the microphone 24 at an upper end portion of the front face of the display section 3 while a hole 8 for receiving the pawl 13 is provided at a predetermined position of the body 2 which opposes the pawl 13. Consequently, when the display section 3 is closed with respect to the body 2, the pawl 13 is fitted in the hole 8 to lock the display section 3 with respect to the body 2.

A slide lever 9 is mounted on a front face of the body 2 as seen in FIG. 3. If the slide lever 9 is slidably moved in the direction of an arrow mark (leftward direction in FIG. 3) along the front face of the body 2, then the pawl 13 fitted in the hole 8 is released to allow the display section 3 to be pivoted with respect to the body 2.

A program power key (PPK) 10 for enabling power supply and automatically activating predetermined application software (hereinafter referred to simply as application) when it is operated once so that a series of operations set in advance may be executed automatically is provided at a left end portion of the front face of the body 2. Meanwhile, a plurality of inlet air holes 11 are provided at a right end portion of the front face of the body 2.

Figure 4:
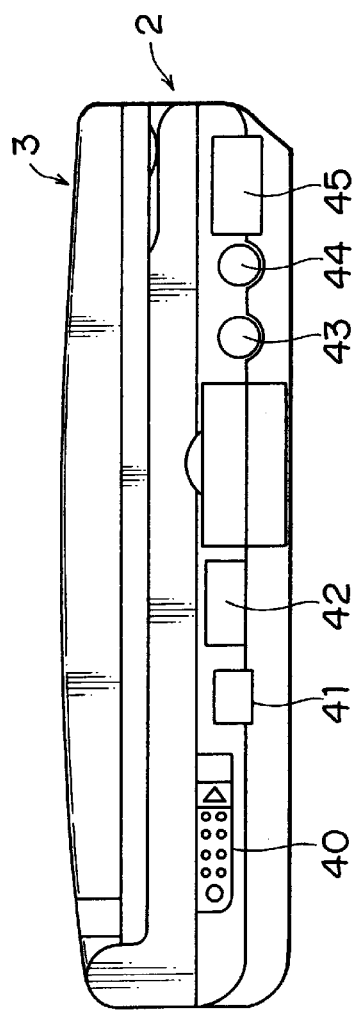
FIG. 4 is a left side elevational view showing a construction of the left side of the personal computer of FIG. 2.

A power supply switch 40 of the slide type, an IEEE (Institute of Electrical and Electronics Engineers) 1394 terminal 41 for 4 pins, a USB (Universal Serial Bus) terminal 42, a microphone input terminal 43, a headphone terminal 44, and an infrared port 45 compliant with the IrDa (Infrared Data Association) are provided on a left-hand side face of the body 2 as shown in FIG. 4.

Figure 5:
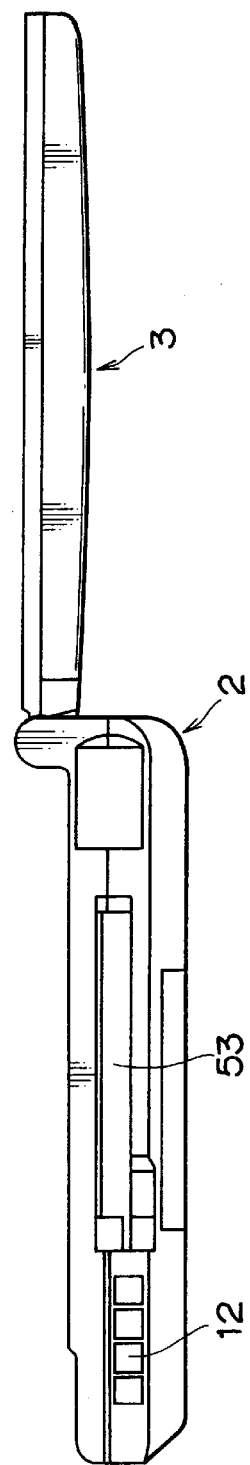
FIG. 5 is a right side elevational view showing a construction of the right side of the personal computer of FIG. 2.

An exhaust air hole 12 is formed in a right-hand side wall of the body 2 as seen in FIG. 5. A PC card slot 53 into which a PCMCIA (Personal Computer Memory Card International Association) card (hereinafter referred to simply as PC card) is to be inserted is provided on the right side of the exhaust air hole 12.

A lid 26 for covering over an opening through which a memory for additional installation is to be installed is mounted on a lower face of the body 2 as shown in FIG. 6. Further, a hole 48 into which a pin for disengaging a locking pawl for the lid 26 is to be inserted is provided on the lower face of the body 2.

Figure 7:
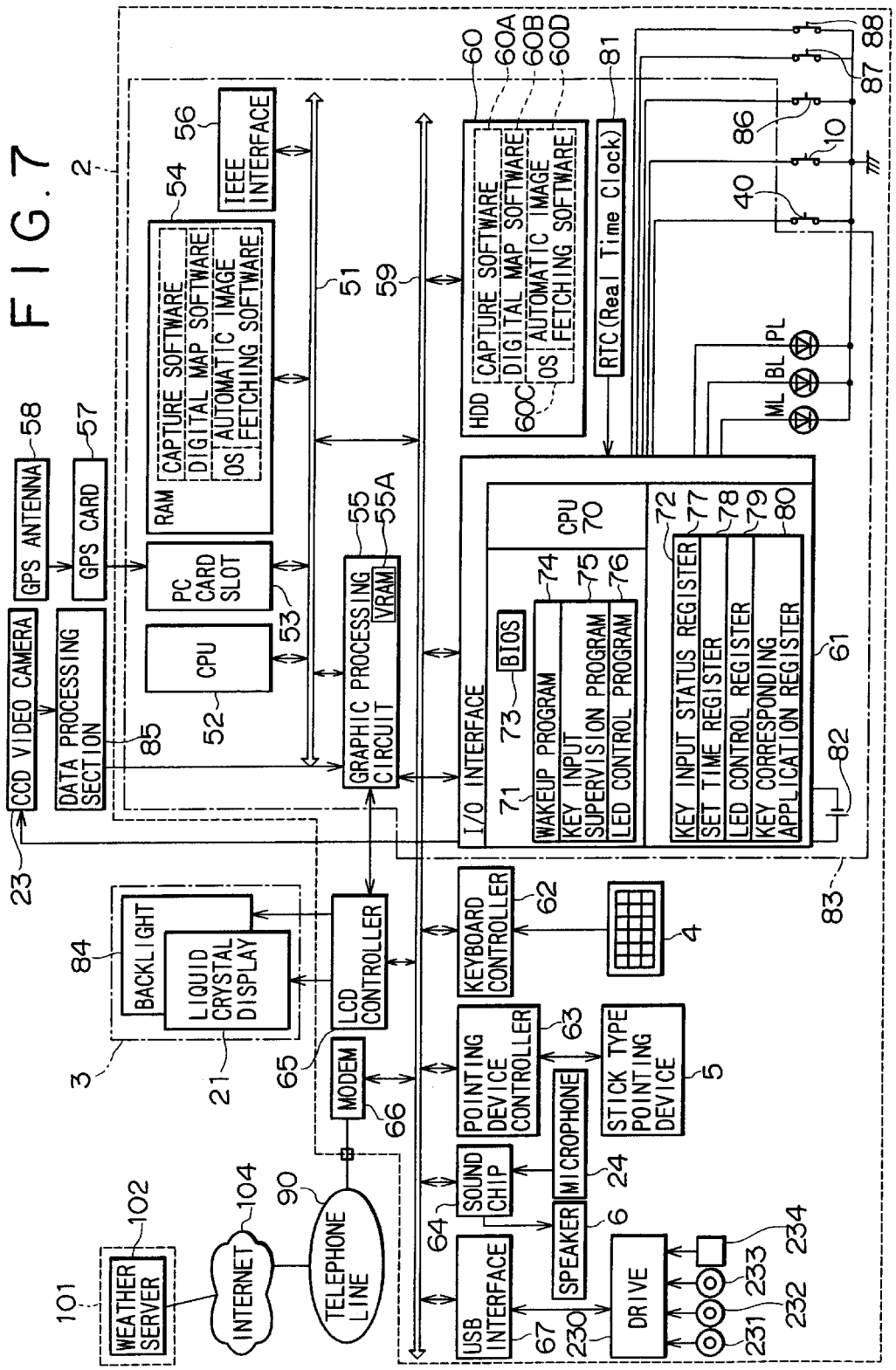
FIG. 7 is a block diagram showing an example of an internal construction of the personal computer of FIG. 2.

FIG. 7 shows an internal electric construction of the personal computer 1. Referring to FIG. 7, a central processing unit (CPU) 52, the personal computer (PC) card slot 53, a random access memory (RAM) 54, a graphic processing circuit 55 for producing an image to be displayed on the liquid crystal display unit 21 of the display section 3 and an IEEE interface 56 connected directly to the IEEE 1394 terminal 41 for being connected to another computer apparatus or an external apparatus to fetch digital data are connected to a peripheral component interconnect (PCI) bus 51 of a startup sequence control section 83.

The CPU 52 is a controller for generally controlling various functions of the body 2 and executes various programs loaded in the RAM 54 so that various functions may be executed.

The PCI bus 51 is connected to an Industrial Standard Architecture (ISA) bus 59. A hard disc drive (HDD) 60, an input/output (I/O) controller 61, a keyboard controller 62, a pointing device controller 63, a sound chip 64, an LCD controller 65, a modem 66 and a USB interface 67 are connected to the ISA bus 59.

Figure 2:
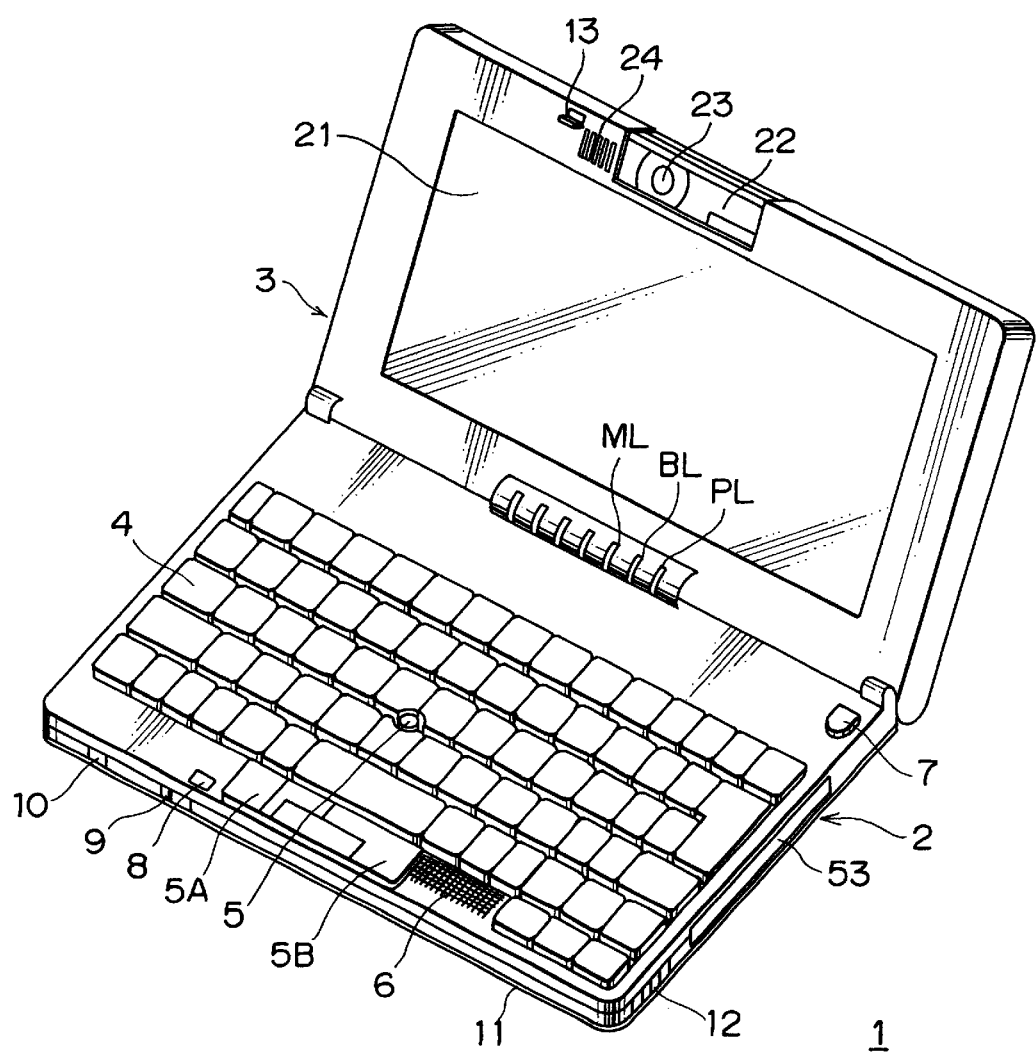
FIG. 2 is a perspective view showing a construction of a personal computer shown in FIG. 1.

The keyboard controller 62 controls inputting of a control signal corresponding to depression of any of the operation keys 4 (FIG. 2). The pointing device controller 63 controls inputting of a control signal from the stick type pointing device 5 (FIG. 2).

The sound chip 64 fetches a sound input from the microphone 24 (FIG. 2) or supplies an audio signal to the built-in speaker 6 (FIG. 2). The modem 66 can be connected to a weather server 102 of a provider 101 through a public telephone network 90 and the Internet 104. The USB interface 67 is connected to the USB terminal 42 so that a peripheral equipment such as a USB mouse or a floppy disk drive can be connected to the USB interface 67. In the arrangement shown in FIG. 7, a drive 230 for driving a magnetic disk 231, an optical disk 232, a magneto-optical disk 233 or a semiconductor memory 234 is connected to the USB interface 67.

The hard disk drive 60 has stored thereon capture software 60A for fetching a still picture, digital map software 60B, an operating system (OS) 60C which is the Windows98 (trademark), automatic image fetching software 60D for automatically fetching and storing image data picked up by the CCD camera 23 and various kinds of application software (not shown). The capture software 60A, digital map software 60B, OS 60C, automatic image fetching software 60D or other application software is read out by the CPU 52 and loaded into the RAM 54 when necessary.

The I/O controller 61 includes an I/O interface 69, a CPU 70, a read only memory (ROM) 71 in the form of an EEPROM (Electrically Erasable and Programmable Read Only Memory) and a RAM 72 connected to each other. To the I/O controller 61, the present time is normally supplied from a real-time clock (RTC) circuit 81.

A basic input/output system (BIOS) 73, a wakeup program 74, a key input supervision program 75 and an LED control program 76 are stored in the ROM 71 of the I/O controller 61. Meanwhile, the RAM 72 has provided therein a key input status register 77, a set time register 78, an LED control register 79, and a key corresponding application register 80.

The key input status register 77 provided in the RAM 72 can store an operation key flag. The CPU 70 supervises the PPK key 10 (FIG. 2) for a single touch operation based on the key input supervision program 75 to detect whether or not the PPK key 10 is depressed. If the PPK key 10 is depressed, then the CPU 70 stores the operation key flag into the key input status register 77.

The set time register 78 can store time information such as a start time set arbitrarily by a user in advance. The CPU 70 detects based on the wakeup program 74 whether or not the present time provided from the RTC circuit 81 comes to the arbitrarily set start time, and executes predetermined processing when the start time comes.

The key corresponding application register 80 has stored therein a corresponding relationship between the PPK key 10 or a combination of operation keys 4 set in advance and an application to be started up. If the PPK key 10 or the combination of operation keys 4 set in advance is depressed, then the CPU 70 signals control data for starting up the corresponding application to the CPU 52 successively over the ISA bus 59 and the PCI bus 51 so that the CPU 52 starts up the application software in accordance with the control data.

The LED control register 79 stores an end flag when the application software stored in the key corresponding application register 80 is started up and the operation comes to an end. The CPU 70 thus controls the message lamp ML to be lit based on the LED control program 76 if it detects that the end flag is stored in the LED control register 79.

It is to be noted that, if the power supply switch 40 is depressed, then the LED control register 79 stores a power supply flag, but when the body 2 operates with a power supply voltage supplied from a battery, the LED control register 79 stores a battery flag. Accordingly, if the CPU 70 detects based on the LED control program 76 that the power supply flag or the battery flag is stored in the LED control register 79, then it lights the power supply lamp PL or the battery lamp BL.

A backup battery 82 is connected to the I/O controller 61 so that, even when the power supply switch 40 of the body 2 is switched off and power is not supplied from a power supply not shown, data of the key input status register 77, set time register 78, LED control register 79 and key corresponding application register 80 of the RAM 72 are maintained with the power from the battery 82.

A reversal switch 88 is connected to the I/O controller 61 and is switched on when the image pickup section 22 (FIG. 2) is turned by 180 degrees in a direction to a position in which the image pickup section 22 picks up an image on the opposite side of the liquid crystal display unit 21 of the display section 3. Also the PPK key 10 notifies the CPU 70 of the condition similarly as in the case when the reversal switch 88 is depressed.

A half-depression key 86 is switched on when the shutter button 7 provided on the upper face of the body 2 is depressed to a half-depressed state, and notifies the CPU 70 of the I/O controller 61 of the half-depressed state. A full depression switch 87 is switched on when the shutter button 7 is fully depressed, and notifies the CPU 70 of the I/O controller 61 of the fully depressed state.

In particular, if the shutter button 7 is depressed to a half-depressed sate by a user when the capture software 60A of the hard disk drive 60 is operating, then the CPU 70 of the I/O controller 61 enters a still picture mode in which it controls the CCD camera 23 to execute freezing of a still picture, and then when the shutter button 7 is depressed to a fully depressed state, the CPU 70 fetches the frozen still picture and signals it to a data processing section 85.

On the other hand, if the CPU 70 of the I/O controller 61 enters a moving picture mode without starting up the capture software 60A, then it fetches moving pictures for approximately 60 seconds in the longest and signals them to the data processing section 85.

The I/O controller 61 controls the graphics processing circuit 55 connected to the PCI bus 51 such that image data in the form of a still picture or moving pictures fetched by the CCD camera 23 are inputted to the graphics processing circuit 55 after predetermined data processing is performed for them by the data processing section 85.

The graphics processing circuit 55 stores the image data supplied thereto into a video random access memory VRAM 55A built therein, suitably reads out the image data and signals the image data to the LCD controller 65. Further, when necessary, the graphics processing circuit 55 stores the read out image data onto the hard disk drive 60.

The LCD controller 65 controls a backlight 84 of the display section 3 to illuminate the liquid crystal display unit 21 from rearwardly and outputs image data supplied thereto from the graphics processing circuit 55 to the liquid crystal display unit 21 so that the image data may be displayed on the liquid crystal display unit 21.

Figure 8:
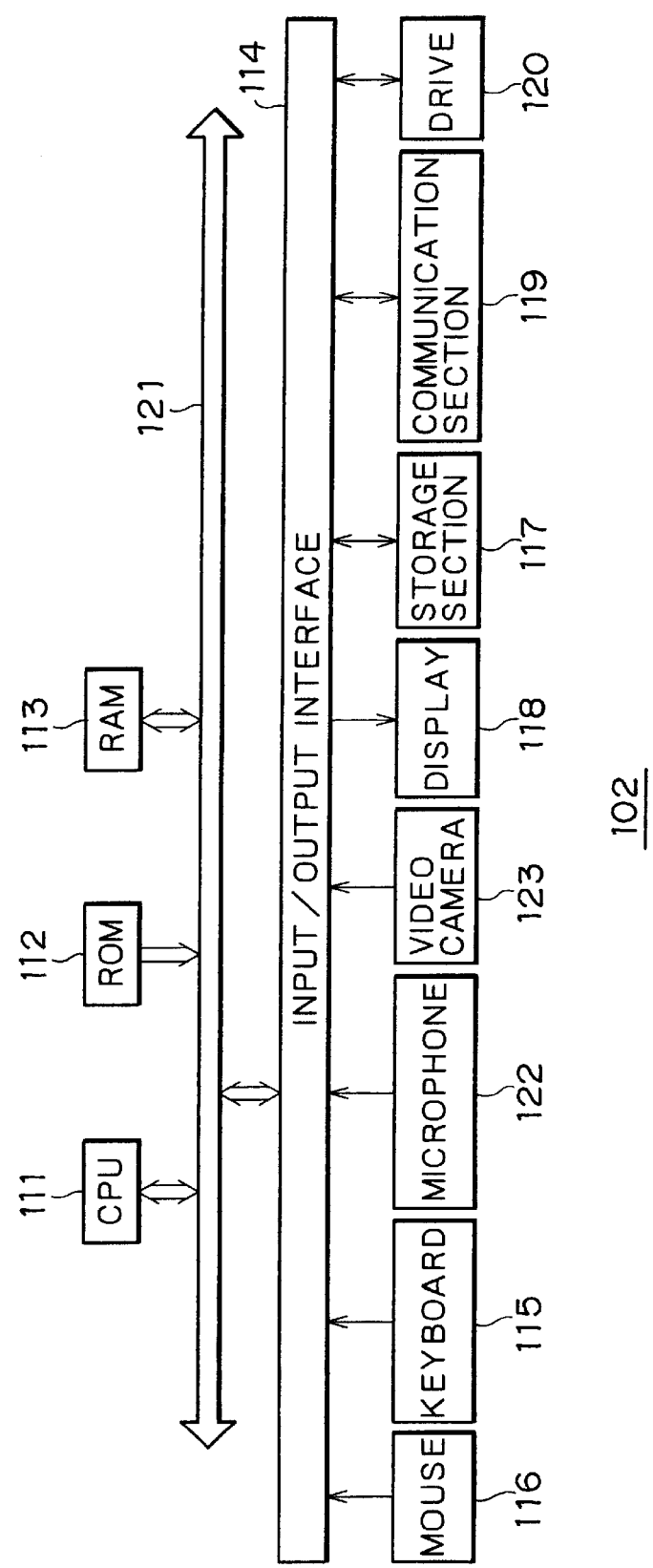
FIG. 8 is a view showing an internal construction of a weather server shown in FIG. 1.

FIG. 8 shows an internal construction of the weather server 102. Referring to FIG. 8, the weather server 102 includes a central processing unit (CPU) 111 which executes various processes in accordance with a program stored in a read only memory-(ROM) 112. The weather server 102 further includes a random access memory RAM 113 into which necessary data or a program is suitably stored when the CPU 111 executes various processes. An input/output interface 114 outputs a signal inputted thereto from a keyboard 115 or a mouse 116 to the CPU 111. Also a storage section 117 formed from a hard disk or the like is connected to the input/output interface 114 such that data or a program is suitably recorded onto or reproduced from the storage section 117.

Further, a display unit 118 as a display device is connected to the input/output interface 114. Also a communication section 119 is connected to the input/output interface 114 so as to allow the weather server 102 to communicate with another apparatus through radio waves, light or infrared rays and the Internet 104. Also a drive 120 is connected to the input/output interface 114 and communicates data with a floppy disk (not shown) or the like. An internal bus 121 connects the CPU 111, ROM 112, RAM 113 and the input/output interface 114 to one another.

The weather server 102 further includes a microphone 122 for fetching sound and a video camera 123 for picking up an image. Data of sound fetched by the microphone 122 and data of an image picked up by the video camera 123 are stored into the storage section 117.

Subsequently, operation of the personal computer 1 shown in FIG. 2 is described with reference to a flowchart of FIG. 9. The personal computer 1 executes the application program with the CPU 52 for an electronic pet stored on the HDD 60 so that a virtual space and an electronic pet which is grown in the virtual space are displayed on the display section 3. Further, the CPU 52 communicates with the weather server 102 through the Internet 104 using the modem 66 when necessary to acquire information regarding the weather (hereinafter referred to suitably as weather information).

If a user operates the keyboard 4 or the stick type pointing device 5 to indicate the application for an electronic pet in step Si, then the CPU 52 starts up the program stored in the hard disk drive 60 to cause a virtual space and an electronic pet to be displayed on the display section 3 as described above. Then, the CPU 52 establishes connection to the weather server 102 in step S2.

A screen display on the display section 3 in step Si is described with reference to FIG. 10. A circle is displayed in an electronic pet display window 131, and an electronic pet 132 is displayed in the circle. An end button 133 which is operated in order to end processing of the application for an electronic pet and a menu button 134 which is operated in order to cause a menu to be displayed in order that some instruction is to be provided to the electronic pet 132 are disposed at an upper portion on the circle in the electronic pet display window 131.

In the screen shown in FIG. 10, also a menu 135 which is displayed when the menu button 134 is operated is displayed on the display section 3. The menu 135 is displayed alongside or in an overlapping position with the electronic pet display window 131. The menu 135 includes a command display section 137 in which commands to be executed by the electronic pet 132 are displayed, and a decision button 136 which is operated in order to decide a command when the command in the command display section 137 is selected. Further, a scroll bar which is operated in order to display those commands which are not displayed in the command display section 137 is provided on the right side of the command display section 137.

If the user wants to cause the electronic pet 132 to perform, for example, backward movement as an operation to be executed by the electronic pet 132, then the user will adjust a cursor 138 to the command "Backward" in the command display section 137. The characters of the command to which the cursor 138 is adjusted are displayed in a reversed display. If the user is satisfied with the command of the reverse display, then the user can operate a decision button 57 to instruct the electronic pet 132 of the command.

Figure 11:
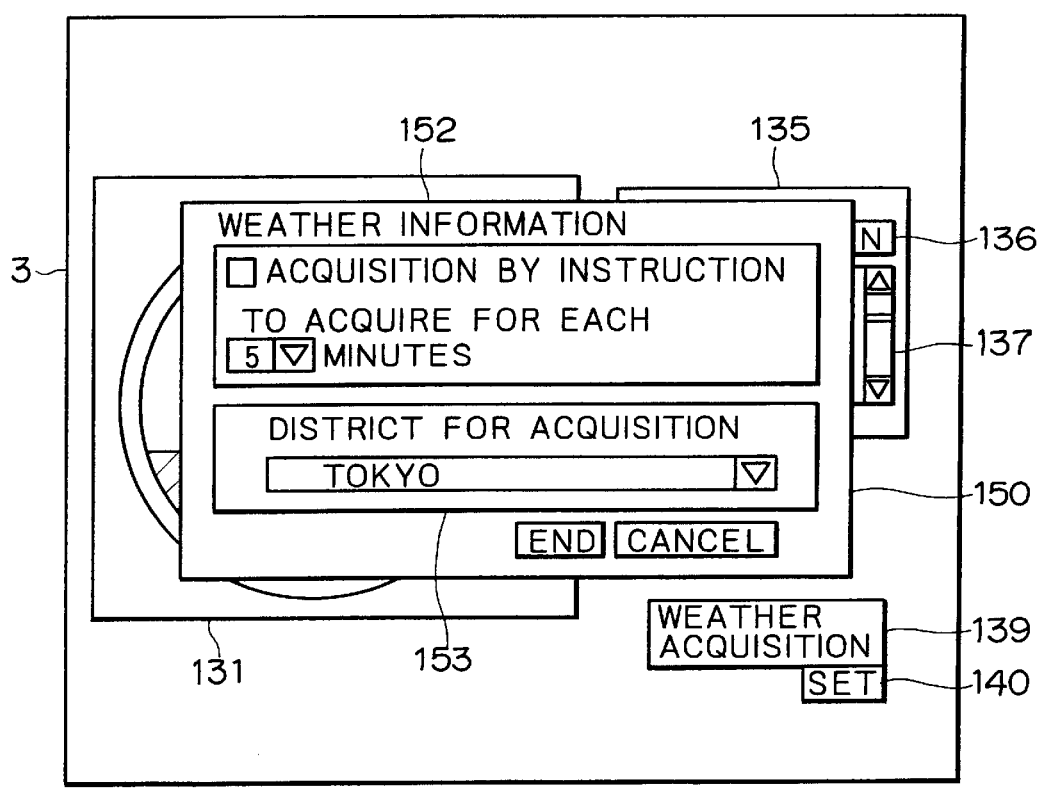
FIG. 11 is a view showing another example of a display image which is displayed on the display section of the personal computer of FIG. 2.

Further, a weather acquisition button 139 which is operated in order to acquire weather information from the weather server 102 and a setting button 140 which is operated in order to perform setting regarding acquisition of weather information are provided on the display section 3. If the setting button 140 is operated, then a setting window 150 on which various settings for acquisition of weather information can be performed is displayed, for example, as shown in FIG. 11.

The setting window 150 includes a time setting window 152 for setting a time interval after which weather information is to be acquired, and a district setting window 153 for setting with regard to which district the weather information is to be acquired. An item which is checked when the weather is to be acquired only when the user itself gives an instruction is provided in an upper stage of the time setting window 152, and another item when weather information is to be acquired after each predetermined time interval is provided in a lower stage of the time setting window 152.

In the item for setting a time interval provided in the lower stage of the time setting window 152, for example, 1 minute, 5 minutes, 10 minutes, 20 minutes or the like can be set in advance. Further, a desired time interval of the user can be set directly in the item.

The district setting window 153 is provided to set with regard to which district the weather information is to be acquired. The district setting window 153 is provided in order to allow the user to acquire weather information of a desired district irrespective of a district in which the user actually is. As districts for acquisition, for example, not only various places of Japan such as Tokyo, Osaka, Hokkaido and Okinawa but also main cities of various countries of the world such as New York and London are registered in advance, and the user can select a desired district from among the registered districts.

If such a setting window 150 is displayed and the user performs desired setting and is satisfied with the setting, then the user will operate an end button provided below the setting window 150. However, if the user wants to end the procedure without setting, then the user will operate a cancel button. Thus, the following description proceeds with the assumption that a desired time and a desired district are set by the user.

Referring to the flowchart of FIG. 9 again, such a screen as shown in FIG. 10 is displayed on the display section 3 in step S1. Then, after connection to the weather server 102 is completed in step S2, it is discriminated in step S3 whether or not weather information is to be acquired from the weather server 102. The processing in step S3 is, in other words, where it is set that weather information is to be acquired only when this is indicated by the user, processing of discriminating whether or not an acquisition indication is provided (whether or not the weather acquisition button 139 is operated), but, where it is set that weather information is to be acquired after each predetermined time interval, processing of discriminating whether or not the predetermined time interval elapses (whether or not that the time at which weather information is to be acquired comes).

If it is discriminated in step S3 that weather information is not to be acquired, then the processing in step S4 is skipped and the processing advances directly to step S5. However, if it is discriminated in step S3 that weather information is to be acquired, then the processing advances to step S4. In step S4, data of a set district with regard to which weather information is to be acquired and a timing at which the acquisition indication is issued are transmitted to the weather server 102.

In step S5, it is discriminated whether or not weather information is received from the weather server 102. The weather server 102 searches for weather information conforming with the condition based on the received data and transmits the weather information through the Internet 104 to the personal computer 1 which has issued the request for acquisition of the information (details are hereinafter described). If it is discriminated that the weather information thus transmitted is received by the modem 66, then the processing advances to step S6, but if it is determined that the weather information is not received, then the processing skips step S6 and advances directly to step S7.

Figure 12A:
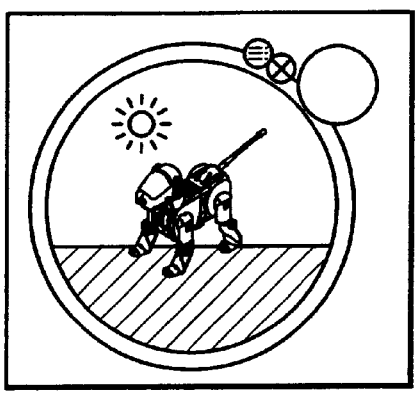
FIGS. 12A to 12E are schematic views showing an example of display images among which the display on the display section is changed over based on weather information.
Figure 12B:
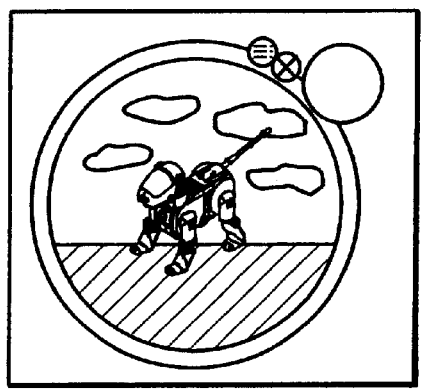

In step S6, the weather of the virtual space (the background of the electronic pet 132) displayed in the electronic pet display window 131 (FIG. 10) is changed over based on the received weather information. The examples of the display of the electronic pet display window 131 among which the weather is changed over are shown in FIGS. 12A to 12E. FIG. 12A shows a display example where the weather information represents a fine weather, and this is represented by display of the blue sky and the sun. FIG. 12B shows a display example where the weather information is a cloudy weather, and this is represented by display of clouds.

Figure 12C:
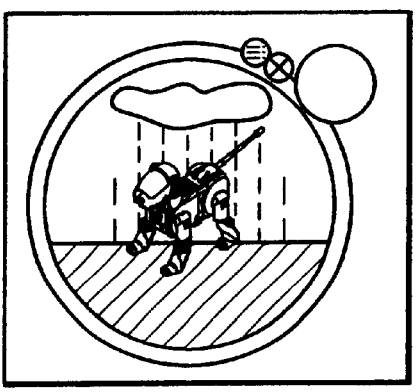
Figure 12D:
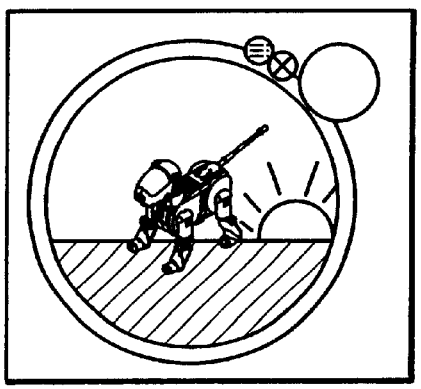
Figure 12E:
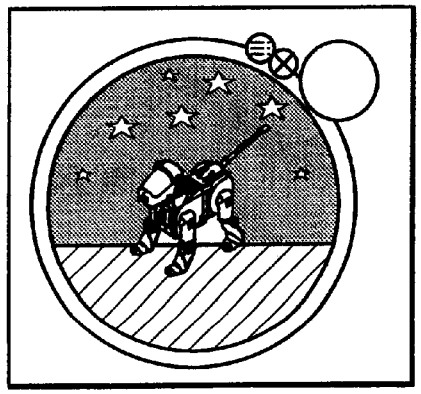

Similarly, FIG. 12C shows a display example where the weather information is a rainy weather; FIG. 12D shows a display example where the weather information is a fine weather in the evening; and FIG. 12E shows a display example where the weather information is a fine weather at night. Where the weather information includes time information in addition to weather in this manner, even if the weather is a fine weather similarly, different displays can be provided depending upon the time as shown in the FIGS. 12A and 12D. Consequently, various backgrounds having abundant variations can be provided for the virtual space together with reality.

The data for varying the background in this manner may be provided as weather information from the weather server 102, or the weather information acquired from the weather server 102 may be analyzed by the personal computer 1 to select and display the most suitable graphic form.

After the weather in the virtual space is changed over in compliance with the weather in the real space as a result of such processing as described above in step S6 or if it is discriminated in step S5 that weather information is not received, then the processing advances to step S7, in which it is discriminated whether or not the application for an electronic pet is to be ended. The processing in step S7 is processing of discriminating whether or not the end button 133 (FIG. 10) is operated.

Figure 9:
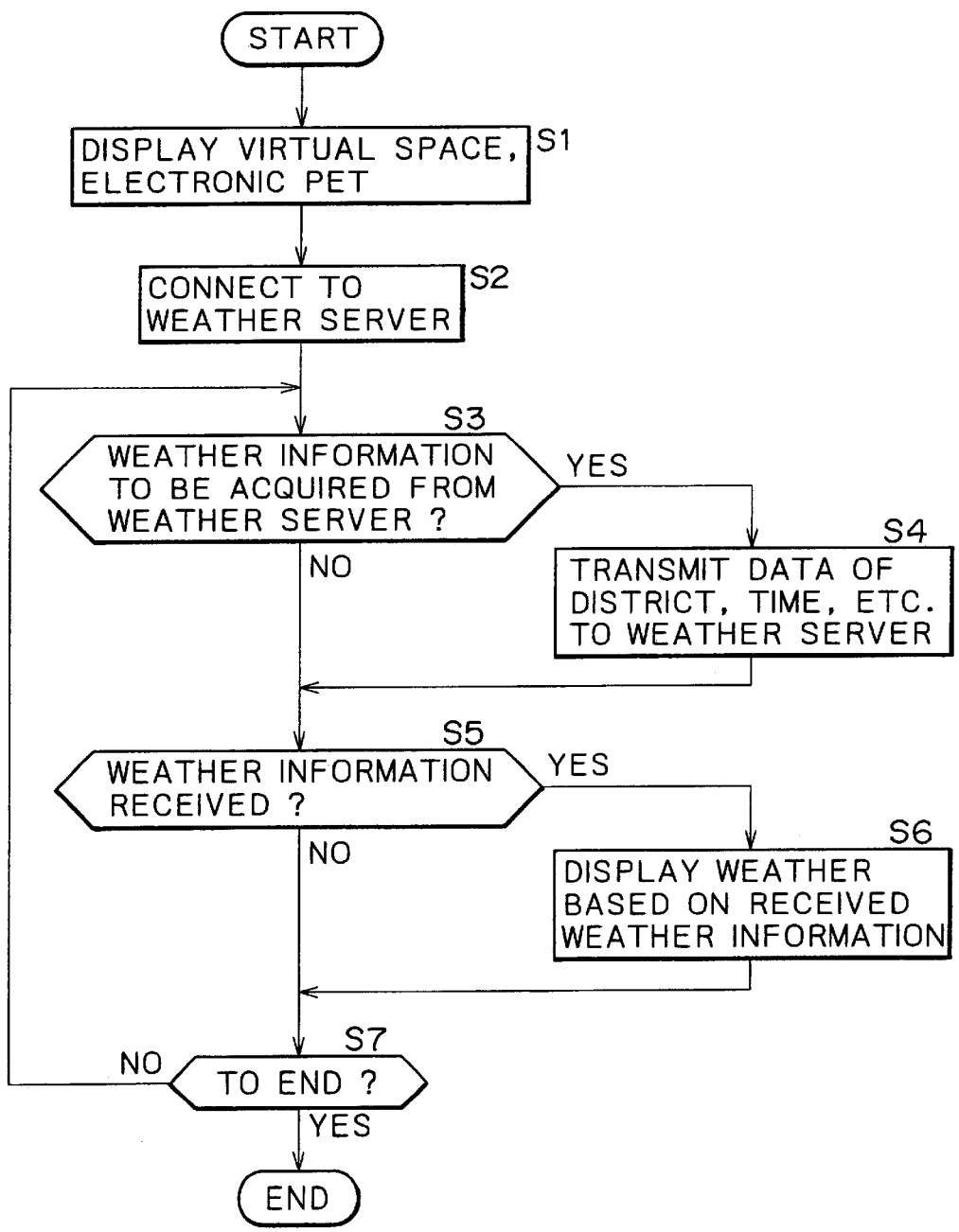
FIG. 9 is a flowchart illustrating operation of the personal computer of FIG. 2.

If it is discriminated in step S7 that the end button 133 is operated and the application for an electronic pet is to be ended, the processing of the flowchart of FIG. 9 is ended. On the contrary, if it is discriminated that the processing of the flowchart of FIG. 9 is not to be ended, the processing returns to step S3 so that the processing in step S3 et seq. is repeated.

Now, operation of the weather server 102 is described with reference to a flowchart of FIG. 13. In step S11, it is discriminated whether or not the weather server 102 is connected to a personal computer 1 through the Internet 104. The processing in step S11 is repeated (waiting state is continued) until after it is discriminated that the weather server 102 is connected to a personal computer 1. After it is discriminated that the weather server 102 is connected to a personal computer 1, processing beginning with step S12 is started. In particular, in step S12, it is discriminated whether or not a request is received from the personal computer 1 to which the weather server 102 is connected.

If it is discriminated in step S12 that a request is received from the personal computer 1, then the processing advances to step S13, but if it is discriminated that no request is received, then the processing skips processing in steps S13 to S15 and advances directly to step S16.

In step S13, it is discriminated whether or not the request from the personal computer 1 is a request for acquisition of weather information. If it is discriminated that the request is a request for acquisition of weather information, then the processing advances to step S14, but if it is discriminated that the request is not a request for acquisition of weather information, then the processing skips processing in steps S14 and S15 and advances directly to step S16.

In step S14, pertaining weather information is read out. As described hereinabove, where the request transmitted from the personal computer 1 is a request for acquisition of weather information, since it includes district information representing to which district the weather information is to be acquired and time information representative of a time at which the request for acquisition is issued, the weather information to be provided decisively from the information is read out from the storage section 117.

Since the weather information to be read out is different depending upon the request from the personal computer 1 in this manner, information only of the district set by the personal computer 1 is accumulated (updated) successively into the storage section 117. While the accumulated weather information in the foregoing description is data composed of information of weather and information of the time or image data of a graphic form regarding weather in the virtual space which is determined decisively from such data, data of an actual image obtained by the video camera 123 (FIG. 8) may alternatively be accumulated as weather information.

Where data of an actual image are accumulated in this manner, the weather server 102 is installed for each district, and each of the weather servers 102 picks up an image of the weather (the look of the sky) of the district at the point of time using the video camera 123 (or alternatively, only such video camera may be installed for each district). The image thus picked up is stored into the storage section 117 of each of the weather servers 102. Then, the image data stored in the storage section 117 are transferred to the other weather servers 102 connected to the weather server 102 over the Internet 104. Each of the weather servers 102 acquires and stores the image data regarding the weather of the individual districts in this manner.

Further, in addition to an image, sound may be fetched by means of the microphone 122 and stored and provided.

Figure 13:
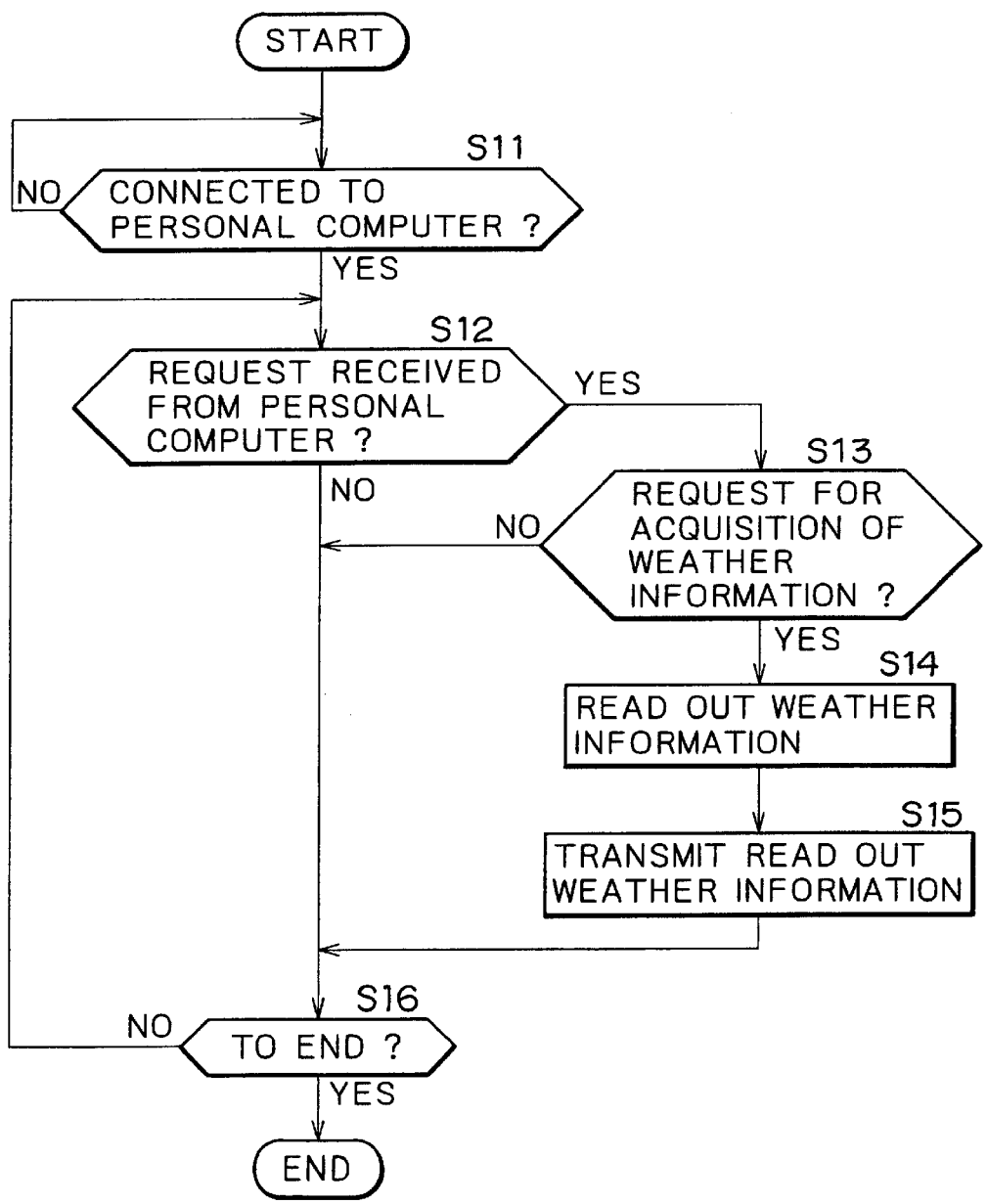
FIG. 13 is a flowchart illustrating operation of the weather server of FIG. 8.

Referring back to the flowchart of FIG. 13, the weather information read out from the storage section 117 in step S14 is transmitted to the personal computer 1, from which the request has been issued, in step S15.

In step S16, it is discriminated whether or not the processing for the personal computer 1 is to be ended. In other words, it is discriminated whether or not the connection to the personal computer 1 is cut. If it is discriminated that the connection to the personal computer 1 is cut, then the processing of the flowchart shown in FIG. 13 is ended. However, if it is discriminated that the connection to the personal computer 1 is not cut, then the processing returns to step S12 so that the processing beginning with step S12 is repeated.

Since image data stored in the storage section 117 of the weather server 102 are provided to the personal computer 1 in this manner, the real-time weather of a district desired and set by the user is reflected on the background of the electronic pet 132 displayed in the electronic pet display window 131.

While no particular description is given of the time in the foregoing description, in order to acquire a precise time, for example, the personal computer 1 may access a home page opened by the Communications Research Laboratory of the Ministry of Posts and Telecommunications of Japan to update the time of the personal computer 1 itself. Similarly, also the weather server 102 accesses the home page mentioned above to update the time of the weather server 102 itself. Where the personal computer 1 and the weather server 102 operate with the accurate time, real-time weather information can be communicated.

Where the weather of the real space is reflected on the screen of the virtual space, a screen of the virtual space abundant with variations can be provided, and it is possible, for example, for a user to recognize the weather outside a room while the user is in the room and also to know the weather of another district on the real time basis.

While the foregoing description relates to the present invention applied to an electronic pet, it can be applied also to 3D chatting and so forth. Where the present invention is applied to 3D chatting, if the same weather information is provided to users who participate in the same chat, then the users can share also the weather in the shared space of the chat. Further, since, other than the electronic pet or the chat space, the personal computer 1 connected to the network can acquire weather information, processing in which the weather information is used may be performed also in other software than those for an electronic pet and for chatting.

While the series of processes described above can be executed by hardware, it may otherwise be executed by software. Where the series of processes is executed by software, a program which constructs the software is installed from a program storage medium into a computer incorporated in hardware for exclusive use or, for example, a personal computer for universal use which can execute various functions by installing various programs.

The program storage medium in which programs (for example, the digital map software 60B, a WWW browser, and an auxiliary program) which are installed into a computer so that they can be executed by the computer are stored may be a package medium such as the magnetic disk 231 (including a floppy disk), the optical disk 232 (including a CD-ROM (Compact Disk-Read Only memory) and a DVD (Digital Versatile Disk)), the magneto-optical disk 233 (including an MD (Mini-Disc)) or the semiconductor memory 234 as shown in FIG. 7 or the ROM 71 or a hard disk of the hard disk drive 60 in or on which the programs are stored temporarily or permanently. Storage of the programs onto the program storage medium is performed making use of a wired or wireless communication medium such as the Internet 104 or a local area network or a digital satellite broadcast through an interface such as a router or the modem 66 when necessary.

It is to be noted that, in the present application, the steps which describe the program provided in the form of a medium may be but need not necessarily be processed in a time series in the order as described, and include processes which are executed parallelly or individually.

Further, the term "system" in the present specification is used to represent an entire apparatus which includes a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. An information processing method, comprising the steps of:

requesting weather data regarding a desired district from an external apparatus;

receiving the weather data and information corresponding to a time at which the weather data was requested regarding the desired district from the external apparatus;

displaying the received weather data and the information corresponding to the time as a background for an electronic pet in a virtual space;

displaying a command display section along with the electronic pet said command display section including commands a user may activate to control the electronic pet;

displaying a weather setting button along with the electronic pet; and displaying a setting window when the weather setting button is selected said setting window including acquiring options for acquiring the weather data.

2. An information processing method according to claim 1, wherein the weather data is image data representative of the weather.

3. An information processing method according to claim 2, wherein the image representative of the weather is an image picked up by an image pickup apparatus.

4. An information processing method according to claim 1, wherein the weather data is requested every predetermined time interval.

5. An information processing apparatus, comprising:

requesting means for requesting weather data regarding a desired district from an external apparatus;

reception means for receiving the weather data and information corresponding to a time at which the weather data was requested regarding the desired district from the external apparatus; and display means for displaying the received weather data and the information corresponding to the time in a predetermined form as a background for an electronic pet in a virtual space;

display means for displaying a command display section along with the electronic pet, said command display section including commands a user may activate to control the electronic pet;

display means for displaying a weather setting button along with the electronic pet; and display means for displaying a setting window when the weather setting button is selected, said setting window including acquiring options for acquiring the weather data.

6. An information processing apparatus according to claim 5, wherein the weather data is image data representative of the weather.

7. An information processing apparatus according to claim 5, wherein the image data representative of the weather is an image picked up by an image pickup apparatus.

8. An information processing apparatus according to claim 5, wherein the weather data is requested every predetermined time interval.

9. A program storage medium on which a computer-readable program to be executed by an information processing apparatus is stored, the program comprising the steps of:

requesting weather data regarding a desired district from an external apparatus;

receiving the weather data and information corresponding to a time at which the weather data was requested regarding the desired district from the external apparatus;

displaying the received weather data and the information corresponding to the time in a predetermined form as a background for an electronic pet in a virtual space;

displaying a command display section along with the electronic pet, said command display section including commands a user may activate to control the electronic pet;

displaying a weather setting button along with the electronic pet; and displaying a setting window when the weather setting button is selected, said setting window including acquiring options for acquiring weather data.

10. A program storage medium according to claim 9, wherein the weather data is image data representative of the weather.

11. A program storage medium according to claim 10, wherein the image data representative of the weather is an image picked up by an image pickup apparatus.

12. A program storing medium according to claim 9, wherein the weather data is requested every predetermined time interval.

* * * * *

UNITED STATES PATENT AND TRADEMARK OFFICE
CERTIFICATE OF CORRECTION

PATENT NO.   : 6,748,326 B1                                                                              Page 1 of 1
DATED        : June 8, 2004
INVENTOR(S)  : Tsunetake Noma et al.

It is certified that error appears in the above-identified patent and that said Letters Patent is hereby corrected as shown below:

Column 7,
Lines 19 and 24, change "Si" to -- S1 --.

Signed and Sealed this

Fourth Day of January, 2005

JON W. DUDAS
*Director of the United States Patent and Trademark Office*